United States Patent
Kaczmarski et al.

(10) Patent No.: US 7,974,950 B2
(45) Date of Patent: Jul. 5, 2011

(54) APPLYING A POLICY CRITERIA TO FILES IN A BACKUP IMAGE

(75) Inventors: Michael Allen Kaczmarski, Tucson, AZ (US); Robert Michael Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/758,612

(22) Filed: Jun. 5, 2007

(65) Prior Publication Data

US 2008/0307527 A1 Dec. 11, 2008

(51) Int. Cl.
*G06F 17/30* (2006.01)

(52) U.S. Cl. ......... 707/640; 707/695; 707/694; 711/162

(58) Field of Classification Search .......... 707/695, 707/609–686, E17.007, 999.2, 999.201–999.205, 707/999.107, 694, 162; 711/161–162
See application file for complete search history.

(56) References Cited

U.S. PATENT DOCUMENTS

| | | | |
|---|---|---|---|
| 5,771,354 A * | 6/1998 | Crawford | 709/229 |
| 5,813,009 A * | 9/1998 | Johnson et al. | 707/100 |
| 6,240,427 B1 | 5/2001 | Szalwinski et al. | |
| 6,535,894 B1 * | 3/2003 | Schmidt et al. | 707/204 |
| 6,877,016 B1 | 4/2005 | Hart et al. | |
| 6,944,815 B2 | 9/2005 | Bierbrauer et al. | |
| 2003/0028514 A1 * | 2/2003 | Lord et al. | 707/1 |
| 2004/0139128 A1 | 7/2004 | Becker et al. | |
| 2005/0071390 A1 * | 3/2005 | Midgley et al. | 707/204 |
| 2006/0010154 A1 * | 1/2006 | Prahlad et al. | 707/102 |
| 2006/0053262 A1 | 3/2006 | Prahlad et al. | |
| 2007/0074290 A1 * | 3/2007 | Kobayashi et al. | 726/24 |

OTHER PUBLICATIONS

PCMAG.COM, Definition from PC Magazine encyclopedia, 1981, Website: http://www.pcmag.com/encyclopedia_term/0,2542,t=hierarchical+file+system&i=44240,00.asp.*

* cited by examiner

*Primary Examiner* — Leslie Wong
*Assistant Examiner* — Amanda Willis
(74) *Attorney, Agent, or Firm* — David W. Victor; Konrad Raynes and Victor LLP

(57) ABSTRACT

Provided are a method, system, and article of manufacture for applying a policy criteria to files in a backup image. A backup image of files in a file system is maintained. A policy is applied to the files in the backup image to determine files satisfying a policy criteria. A list is prepared indicating the determined files. The determined files in the file system are accessed and a deferred operation indicated in the applied policy is applied to the accessed files in the file system.

18 Claims, 7 Drawing Sheets

Policy Information

Deferred Operation List Entry

APPLYING A POLICY CRITERIA TO FILES IN A BACKUP IMAGE

BACKGROUND OF THE INVENTION

1. Field of the Invention

The present invention relates to a method, system, and article of manufacture for applying a policy criteria to files in a backup image.

2. Description of the Related Art

In a backup computing environment, backup client programs transfer client files in a client file system to a backup server program to backup the files in a backup image. The Tivoli® Storage Manager (TSM) backup archive client may backup all client files by transferring an object including the client files to a TSM backup server that manages backup objects for multiple clients. (Tivoli is a registered trademark of International Business Machines Corporation in the United States and other countries)

A data manager may develop policies to apply to the client file systems, such as archive policies, migration policies, anti-virus scanning, etc. For instance, multiple tools are today deployed in heterogeneous distributed computing environments to provide data protection, analyze data storage demographics (SRM), scan for viruses, index data stored on disks or archive data for retention requirements driven by regulatory requirements, litigation concerns or other business policy. Each of these tools may require client processor cycles to scan client file systems and databases and transmit data to the various management servers. These scanning activities applied to the client file systems may negatively impact the performance and availability of other applications that are running on the system.

There is a need in the art for improved techniques for applying policies to data in a file system.

SUMMARY

Provided are a method, system, and article of manufacture for applying a policy criteria to files in a backup image. A backup image of files in a file system is maintained. A policy is applied to the files in the backup image to determine files satisfying a policy criteria. A list is prepared indicating the determined files. The determined files in the file system are accessed and a deferred operation indicated in the applied policy is applied to the accessed files in the file system.

DETAILED DESCRIPTION

Figure 1:
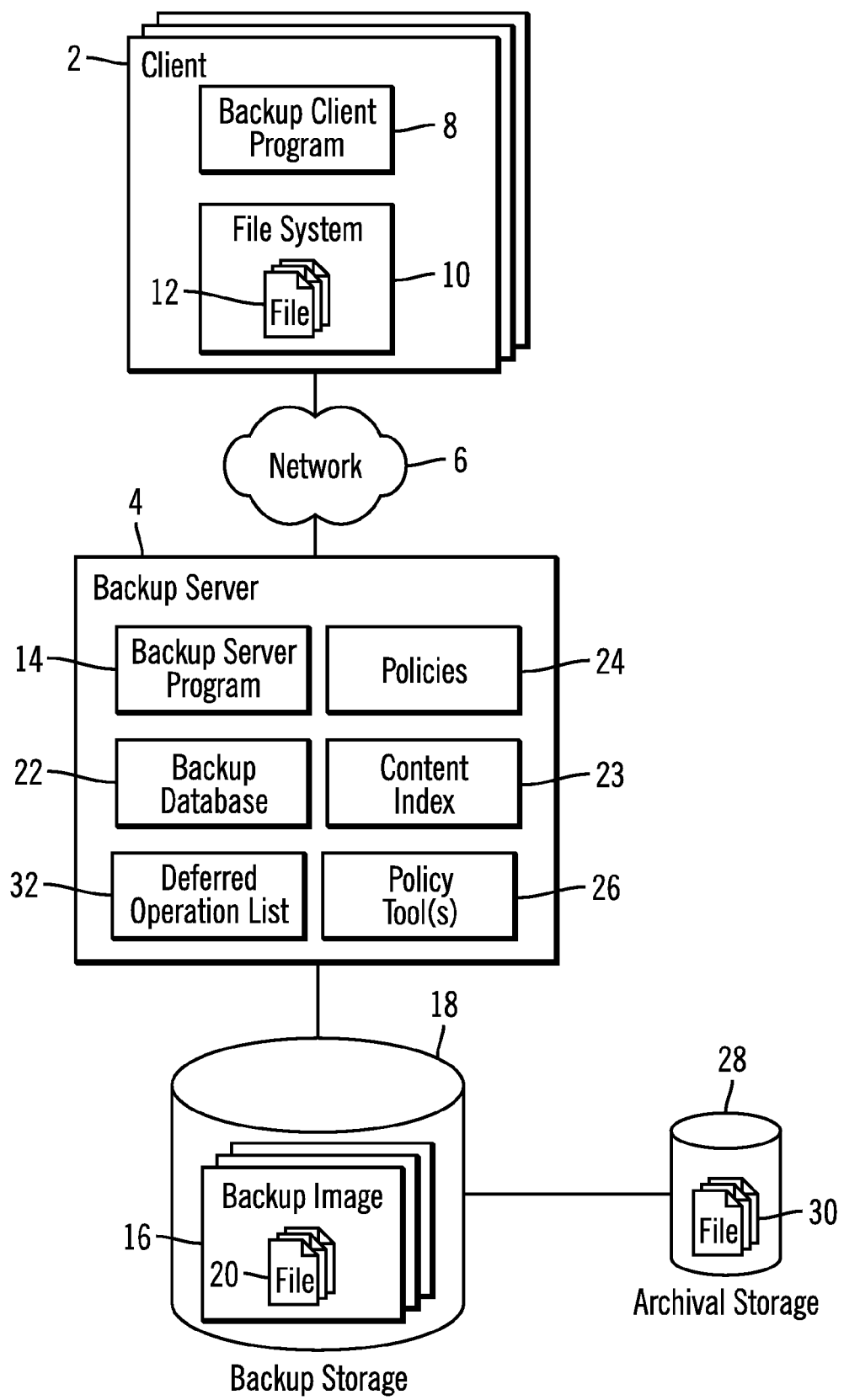
FIG. 1 illustrates an embodiment of a network backup computing environment.

FIG. 1 illustrates an embodiment of a network computing environment. One or more clients 2 communicate with a backup server 4 over a network 6. A client 2 includes a backup client program 8 and a file system 10 having files 12, such as a hierarchical file system. The backup client program 8 gathers files 12 to backup and transfers them to a backup server program 14 on the backup server 4. The backup client program 8 communicates backup related requests to the backup server program 14. The backup server program 14 maintains backup images 16 of files from different client 2 systems in a backup storage 18. A backup image 16 includes files 20 comprising backup copies of files 12 from the client file system 10. Further, information on files 20 in the backup images 14 may be maintained in a backup database 22. A record may be maintained in the backup database 22 for each file backed-up indicating the location of the file in backup storage 18, and other metadata on the file. The backup server 4 further maintains a content index 23 comprises an index that provides keywords of content in the files 20 to enable searching on the keywords to locate files 20 that have the searched keywords.

The backup server 4 further maintains policies 24 and policy tools 26 comprising code that applies the policies 24 to files 20 in the backup images 16 to determine whether an action associated with the policy should be performed with respect to the source files 12 at the client file system 10. For instance, an archive policy may specify to archive files to an archival storage 28 as archived files 30, a migration policy may specify to migrate files 20 satisfying a migration policy criteria to different storage media in a hierarchical storage management (HSM) system, a content policy may specify to archive files having certain content, and an anti-virus policy may seek to delete files including malicious code, such as a virus, spyware, etc. The criteria used to determine whether to migrate or archive file may relate to the time the file was last updated, size, importance, type of file, content, etc.

In certain embodiments, the policy tools 26 may apply policies 24 to files 20 in the backup image 16 and generate a deferred operation list 32 of policy defined operations to perform on files 12 in the client file system 10.

The clients 2 that communicate with the backup server 4 may comprise suitable computational devices known in the art, such as servers, desktop computers, workstations, mainframes, hand held computing devices, telephony devices, etc. The backup server 4 may comprise a suitable server system known in the art. The backup storage 18 may be implemented in a storage system known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a single storage device, a tape library, an optical library, a network attached storage (NAS), etc. The network 6 may comprise a Wide Area Network (WAN), Local Area Network (LAN), Storage Area Network (SAN), wireless network, the Internet, an Intranet, peer-to-peer network, etc.

Figure 2:
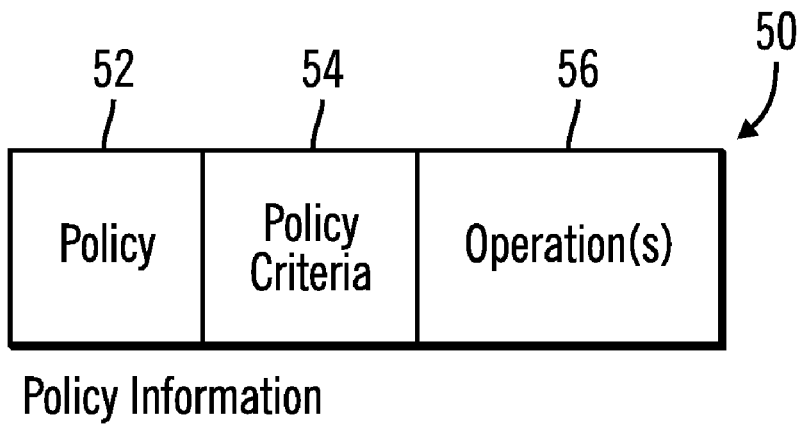
FIG. 2 illustrates an embodiment of policy information.

FIG. 2 illustrates an embodiment of an instance of policy information 50 maintained for one policy 24, including a policy 52 name or identifier; a policy criteria, 54 such as a criteria concerning the file content or file attributes the file must satisfy before one or more associated operations 56 are performed. For instance, if the policy comprises an archival or migration policy, then the policy criteria 54 may specify a file attribute, e.g., date, time last updated, size, file type, content, etc., that must be satisfied by the file before the specified archival or migration operation 56 is performed. An archival operation may copy files from the file system 10 or backup image 16 to archival storage 28, a migration operation may copy files to different storage media in a hierarchical storage management system, etc. For an anti-virus policy, the policy criteria 54 may specify a virus definition file containing instances of malicious code, such as viruses, spyware, etc., such that a delete operation is applied to a file including the malicious code. For a content policy, the policy criteria 54 may specify a content index 23 that provides keywords of content for files and a content criteria, such as keywords, etc. The content policy tool 26 may scan the content index 23 to determine whether the backup file 20 being considered has keywords or content satisfying the policy content criteria 54. The backup image 16 may periodically be scanned to update the content index 23 and file and keyword content information in the index 23. The operations 56 of the policy, such as archival, protecting, etc., may apply to all files identified in the content index 23 that include content matching the policy content criteria. The operations 56 may specify operations to perform on the backup file 20 in the backup image 16 (e.g., transfer to archival storage, migrate, delete) and deferred operations to apply to the source file 12 in the file system 10.

Figure 3:
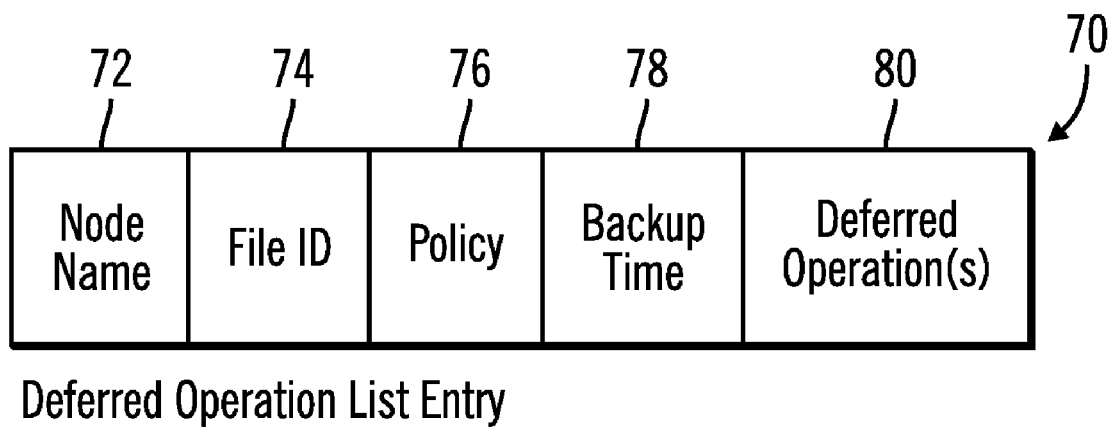
FIG. 3 illustrates an embodiment of a deferred operation list entry.

FIG. 3 illustrates an embodiment of a deferred operation list entry 70 in the deferred operation list 32 generated for each file 20 in the backup image 16 identified as satisfying a policy criteria 54. A deferred operation entry 70 may include: node name 72 identifying the client 2 including the identified file 74 to which the deferred operation(s) 80 apply. The deferred operations 80 comprise the operations 56 identified in the policy information 50 (FIG. 2) for the identified policy 76 that are to be applied to the source files 12 in the client file system 10. For instance, for an archival policy, the deferred operation 80 may comprise deleting the file 12 from the file system. For a migration policy, the deferred operation 80 may comprise replacing the file 12 in the client file system 10 with a stub file having information on the migrated file, such as the location in the hierarchical storage management system where the migrated file is located. A backup time 78 indicates the time the file 20 in the backup image 16, to which the identified policy 76 was applied, was backed-up from the file 12 in the file system 10.

Figure 4:
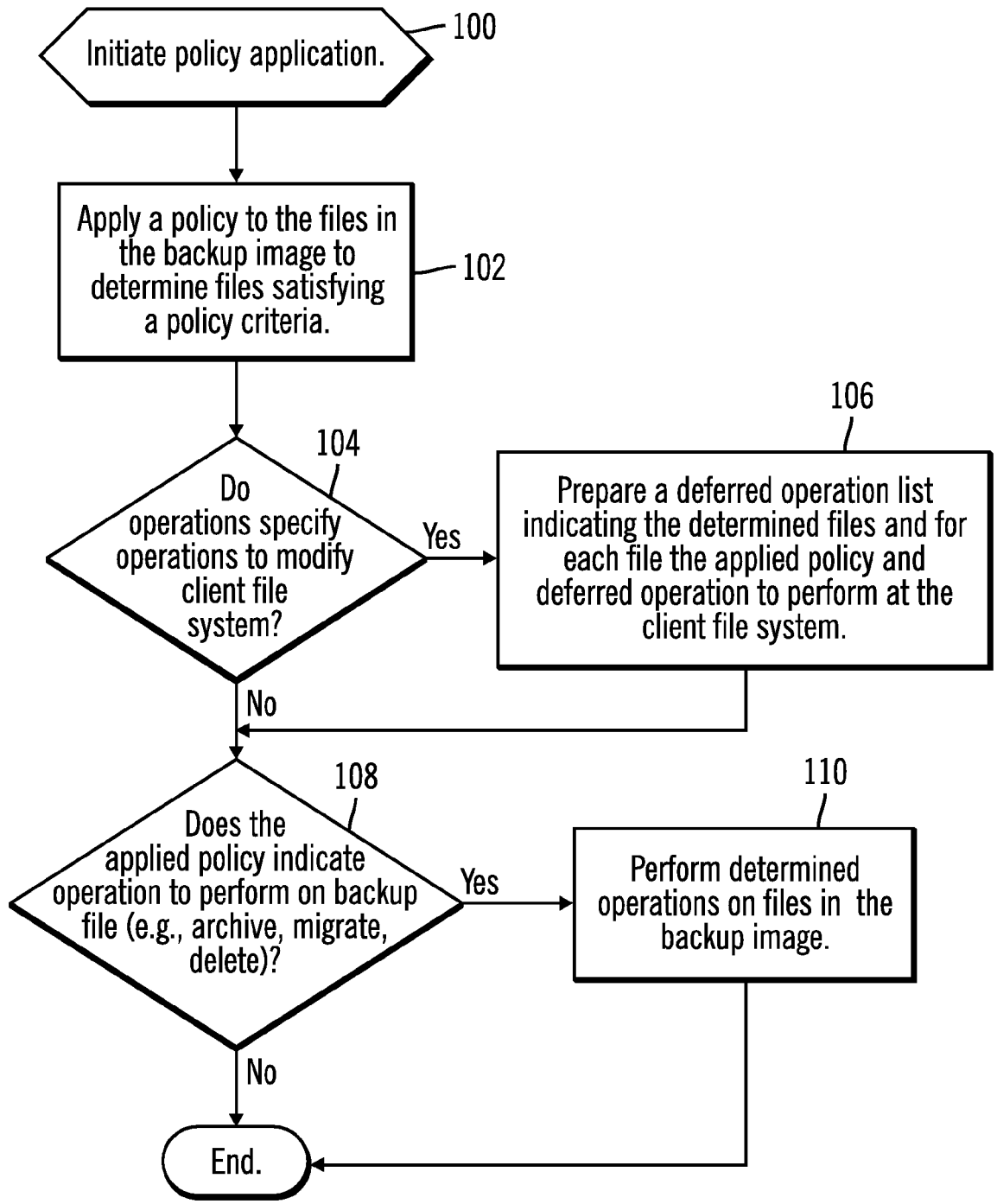
FIG. 4 illustrates an embodiment of operations to apply a policy to a backup image.

FIG. 4 illustrates an embodiment of operations performed by the policy tools 26 to apply data management policies to files in the file system 10 backed-up in the backup image 16. Upon initiating a policy application (at block 100), the policy tool 26 applies (at block 102) a policy 24 to the files 20 in the backup image 16 to determine files 20 satisfying a policy criteria 54 (FIG. 2). If (at block 104) the policy operations 56 specify operations to modify the file 12 in the client file system 10, then the policy tool 26 adds (at block 106) entries 70 (FIG. 3) to the deferred operation list 32 indicating the determined files 20, which comprise copies of files 12 in the file system 10, and for each file 20, the applied policy 76 and deferred operation 80 to perform on the file 12 in the client file system 10. For instance, if the policy operations 56 specify that the file in the client file system 10 is to be deleted, then the deferred operation 80 specified in the deferred operation list 32 comprises a delete operation. If the policy tool 26 applies a migration policy to migrate files 12 in the client file system 10 to a storage device in a hierarchical storage management system, then the deferred operation 80 may comprise replacing the file 12 in the file system 10 with a stub file including information on where the file 12 was migrated. Other policies may also be applied, such as ant-virus policies to delete files having malicious code, etc.

After adding an entry to the deferred operation list 32 (from block 106) or if there is no modification of the client file system 10 for the applied policy (from the no branch of block 104), the policy tool 26 determines (at block 108) whether the applied policy indicates an operation to perform on the backup file 20, such as archive, migrate and/or delete the file 20. If so, the policy tool 26 performs (at block 110) the determined operation, such as copy the backup file 20 to an archive file 30 in the archival storage 28 or some other storage device in a hierarchical storage management system, and/or delete the file.

Figure 5:
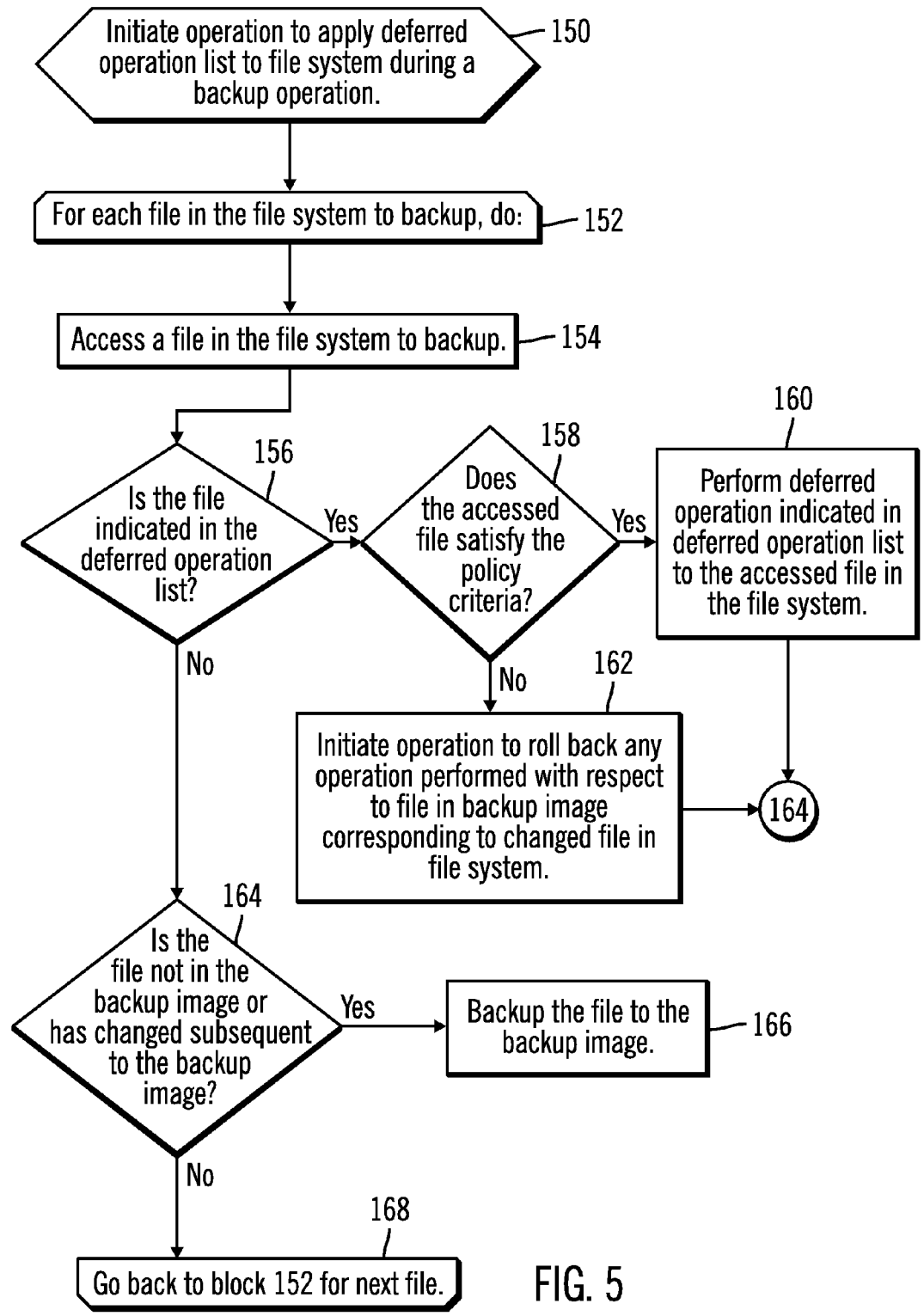
FIG. 5 illustrates an embodiment of operations to apply deferred operations to a file system.

FIG. 5 illustrates an embodiment of operations to apply the deferred operation list 32 to the client file system 10. In one embodiment, the backup server program 14 may transmit the deferred operation list 32 to the backup client program 8 to apply to files 12 in the client file system 10 during a backup operation of files 12 to the backup server program 14 to store in a backup image 16. In alternative embodiments, the client 2 may apply the deferred operation list 32 during operations unrelated to a backup operation. Upon initiating (at block 150) an operation to apply the deferred operation list 32 to the client file system 10 during a backup or other operation, the backup client program 8 performs the operations at block 152 to 164 for each file 12 in the client file system 10 to backup. A file 12 in the file system 10 is accessed (at block 154) to consider. If (at block 156) the accessed file is in the deferred operation list 32, then the backup client program 8 determines (at block 158) whether the accessed file 12 still satisfies the policy criteria 54. If so, then the backup client program 8 performs (at block 160) the deferred operation 80 indicated in the deferred operation list entry 70 to the accessed file 12 in the client file system 10. If (at block 158) the changed file 12 does not satisfy the policy criteria 54, then the backup client program 8 initiates (at block 162) an operation to roll-back any operation performed with respect to the file 20 in the backup image 16 corresponding to the changed file 12 in the client file system 10.

If the accessed file 12 is not on the deferred operation list 32 (from the no branch of block 156) or the deferred operation has been performed (from block 160) or the roll-back operation was performed (from block 162), then control proceeds to block 164 where the backup client program 8 determines whether the accessed file 12 is not in the backup image 16 or has changed subsequent to the creation of the backup image 16. If the accessed file 12 is new or has changed, then the backup client program 8 initiates an operation to backup (at block 166) the accessed file 12 to the backup image 16. If the file has not changed since the last backup image 16 or is not new, then control proceeds to block 168 to consider the next file 12.

In one embodiment, the backup client program 8 may send a message to the backup server program 14 indicating that the changed file 12 in the file system does not satisfy the policy criteria, and the backup server program 14 would then roll-back the policy operation performed with respect to the backup file 20. In this way, the backup server program 14 does not commit changes to the files 20 in the backup image 20 for policy related operations, e.g., archiving, migrating, deleting, until receiving confirmation from the backup client program 8 that the deferred operation was performed on the source file 12. Moreover, at block 160, the backup client program 8 may initiate the operation to update the backup file 20 by sending a message to the backup server program 14 indicating that the deferred operation was applied. In response to this message that the deferred operation completed, the backup server program 14 may commit the previous change to the backup file 20.

With the described embodiments, policy rules and operations may be applied to backup files comprising a backup image of source files in a file system. In this way, the application of the policy rules and operations does not interfere with real-time file system operations because the policy is applied on a backup image of the files. Further, a deferred operation list is created to apply operations on the source files in the source file system to complete the application of the policy. In certain embodiments, the deferred operations may be applied as part of another operation unrelated to the policy application, such as a backup operation on the source file system during a time the source files are being accessed and processed. In this way, application of the deferred operations does not create separate process that could impact the performance of the file system.

Figure 6:
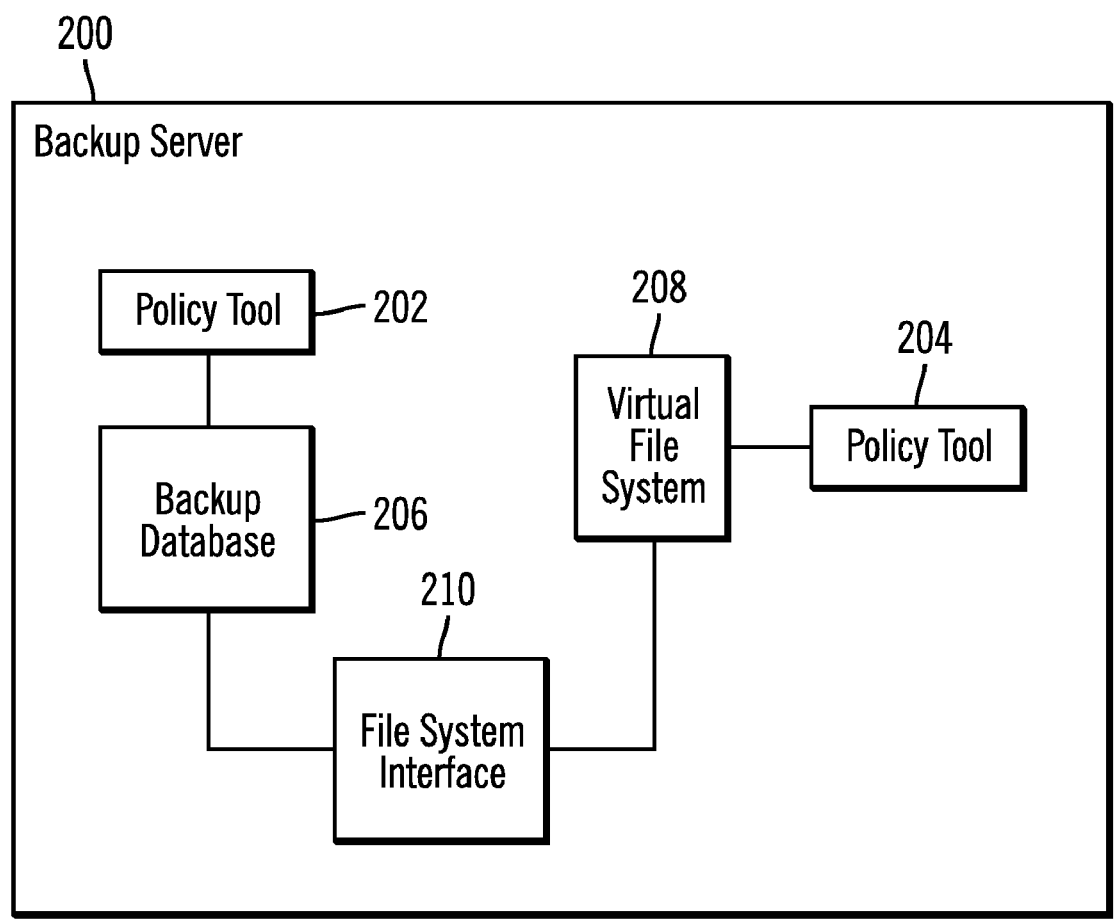
FIG. 6 illustrates an embodiment of a backup server.

FIG. 6 illustrates an additional embodiment of a backup server 200, which may comprise the backup server 4 described with respect to FIG. 1, including policy tools 202 and 204, a backup database 206 (such as backup database 22), a virtual file system 208, and a file system interface 210. In the embodiment of FIG. 6, policy tool 202 is capable of accessing the backup database 206 to access backup files 20 to apply policies 24 to the backup files 20. For instance, the policy tool 202 may include a database client or interface program to communicate with the backup database 206. Policy tool 204 may only be capable of performing operations against a file system, such as by scanning the file system for files to access. For policy tool 204, a file system interface 210 may scan the backup database 206 to generate a virtual file system 208 that provides a representation of the files 20 indicated in the records of the backup database 206. The policy tool 204 would issue access requests to files in the virtual file system 208 that would be handled by the file system interface 210 that interfaces with the backup database 206 to access the backup file 20 the policy tool 204 requested via the virtual file system 208.

Figure 7:
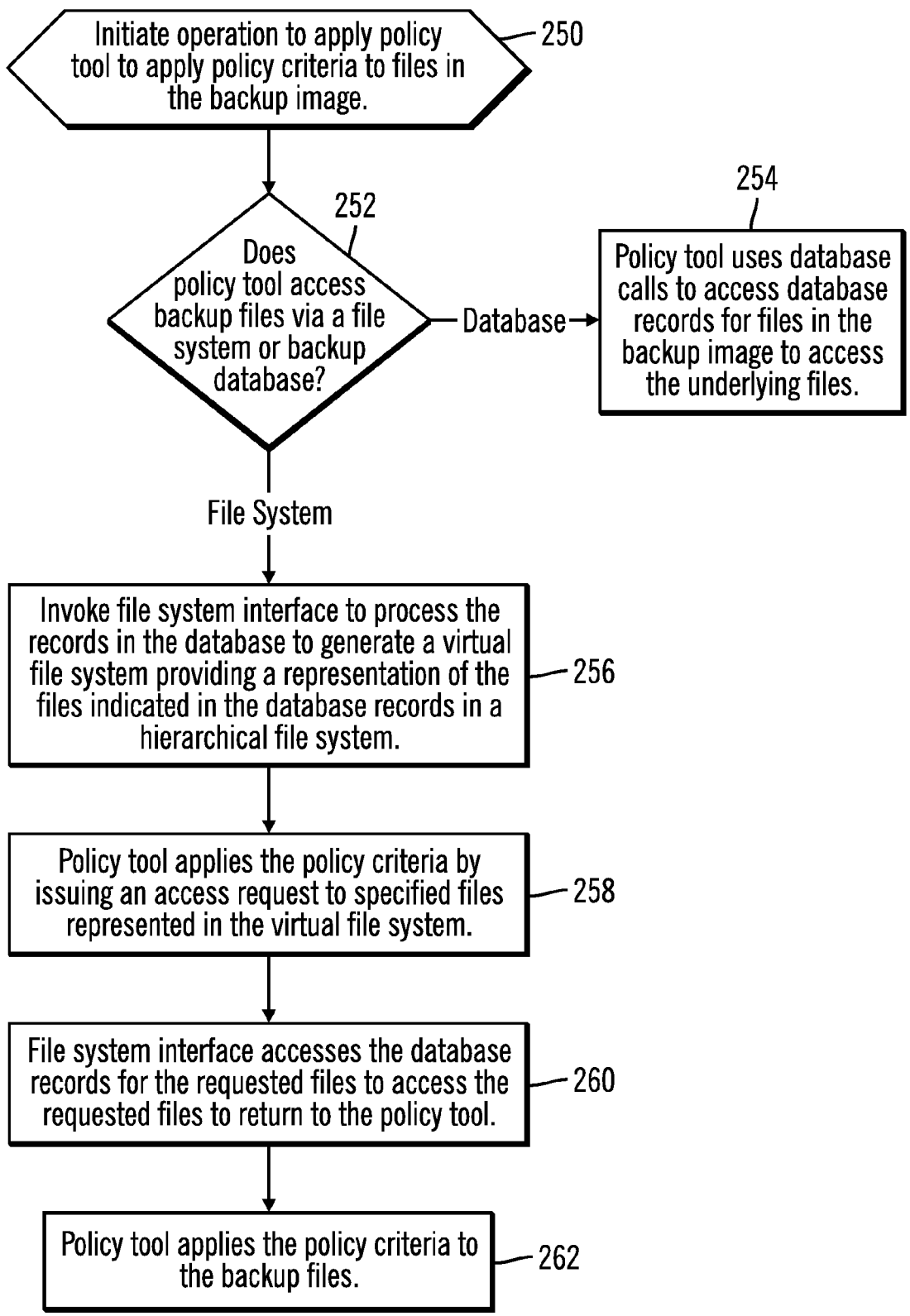
FIG. 7 illustrates an embodiment of operations to apply a policy to a backup image using a virtual file system.

FIG. 7 illustrates an embodiment of operations for policy tools 202, 204 to access backup files 20 using the backup database 206 directly or via the virtual file system 208. Upon a policy tool 202, 204 initiating (at block 250) an operation to access backup files 20, if (at block 252) the policy tool 202 is capable of accessing the backup database 206 directly to access backup files 20, then the policy tool 202 uses (at block 254) database calls to access database records for files 20 in the backup image 16 to access the underlying files 20. If (at block 252) the policy tool 204 only access files through a file system, then the file system interface 210 is invoked (at block 256) to process the records in the backup database 206 to generate a virtual file system 208 providing a representation of the files 20 indicated in the database 206 records in a hierarchical file system. The policy tool 204 applies (at block 258) the policy criteria by issuing an access request to specified files 20 represented in the virtual file system 208. The file system interface 210 receives the access request and accesses (at block 260) the database 206 records for the requested files to return to the policy tool 204. The policy tool 204 applies (at block 262) the policy criteria to the accessed backup files 20.

With the described embodiments, policy tools may either access the backup database directly to access backup files in a backup image to process or via a virtual file system if the policy tool does not include the interface code to directly access the backup database 206.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the policy tools and policies are applied by a backup server to a backup image and the deferred operation list is sent to a client to be applied by a client backup program to the source file system. In an alternative embodiment, the operations described with respect to the backup server program to apply the policy criteria to a backup image and generate a deferred operation list may be performed by the same system managing the source file system, so that the same system applies the policies, generates the deferred operation list, and then applies the deferred operation list to the source file system as part of a backup operation or other operation unrelated to application of the policy.

Figure 8:
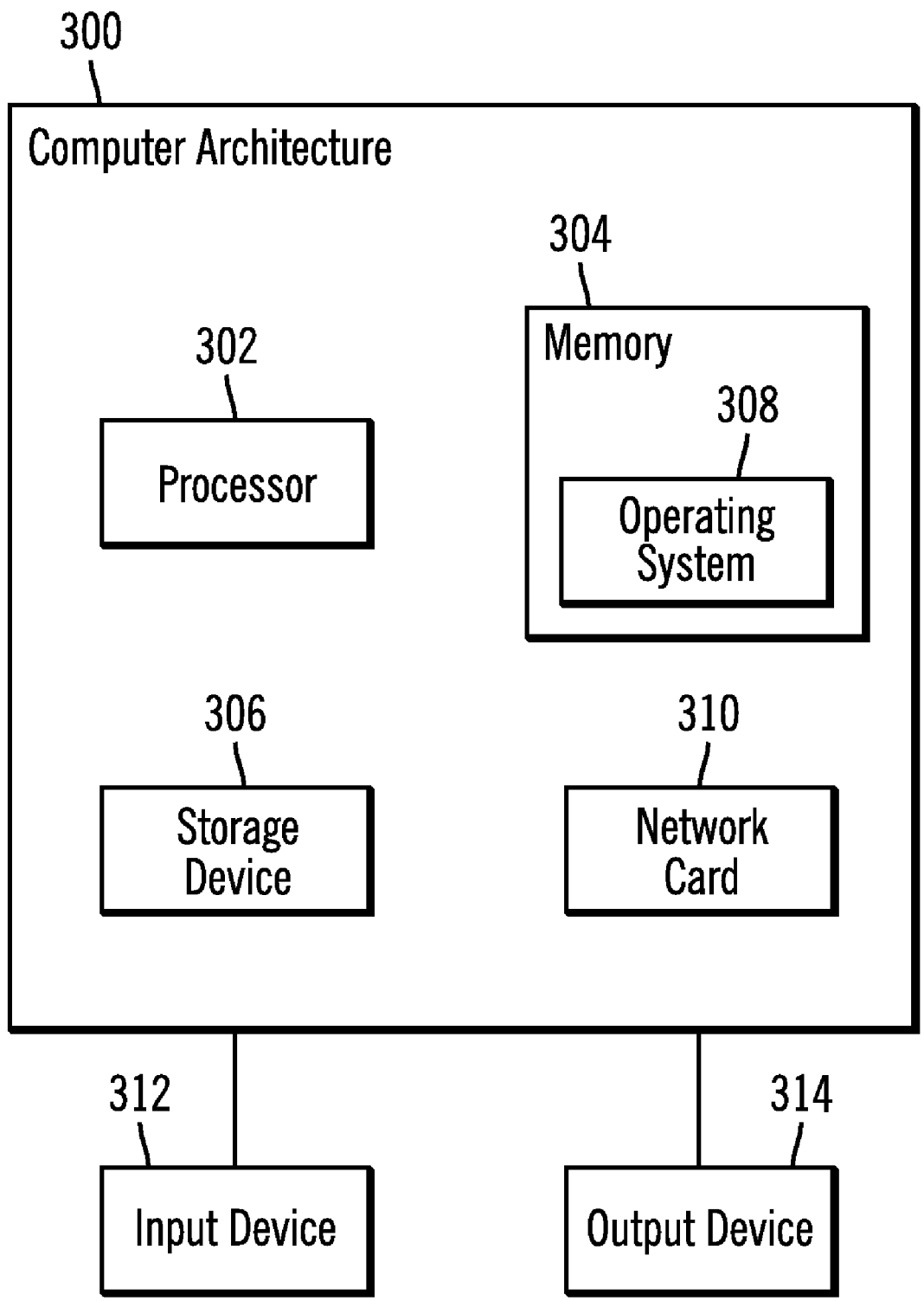
FIG. 8 illustrates an embodiment of a computer architecture that may be used with the systems in FIG. 1.

FIG. 8 illustrates one implementation of a computer architecture 300 that may be implemented at the clients 2 and the backup server 4 of FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308, device drivers and application programs, in the storage 306 are loaded into the memory 304 and executed by the processor 302 in a manner known in the art. The architecture further includes a network card 310 to enable communication with a network. An input device 312 is used to provide user input to the processor 312, and may include a keyboard, mouse, pen-stylus, microphone, touch sensitive display screen, or any other activation or input mechanism known in the art. An output device 314 is capable of rendering information transmitted from the processor 312, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising computer readable storage medium including code executed in communicate with a file system and to perform operations, the operations comprising:
    maintaining a backup image of backup files comprising backup copies of source files in the file system, wherein real time file system operations are performed with respect to the source files in the file system;
    applying a policy to the backup files in the backup image to determine backup files satisfying a policy criteria;
    preparing a list indicating the determined backup files satisfying the policy criteria;
    accessing the source files in the file system from which the determined backup files indicated in the list where copied;
    determining whether the accessed source files have changed subsequent to a creation of the backup image;
    applying the policy criteria to the accessed source files to determine accessed source files satisfying the policy criteria; wherein the policy is applied to the accessed source files that have changed subsequent to the creation of the backup image; and
    applying a deferred operation indicated in the applied policy to the determined accessed source files in the file system determined to satisfy the policy criteria, wherein the deferred operation is performed on the accessed source file in the file system in response to determining that the changed accessed source file satisfies the policy criteria and the deferred operation is not performed in response to determining that the changed accessed source file does not satisfy the policy criteria.

2. The article of manufacture of claim 1, wherein the policy comprises an archive policy, and wherein the operations further comprise:
    copying the determined backup files from the backup image to an archival storage in response to determining that the accessed determined file policy indicates to archive the determined backup files, wherein the deferred operation comprises deleting the accessed source files in the file system.

3. The article of manufacture of claim 1, wherein the operations further comprise:
    performing an operation indicated in the applied policy to the determined backup file in the backup image before accessing the source files in the file system from which the determined backup files indicated in the list were copied.

4. The article of manufacture of claim 3, wherein the operations further comprise:
    committing the operation performed on the determined backup file in the backup image in response to receiving indication that the deferred operation completed.

5. The article of manufacture of claim 1, wherein the source files are accessed in the file system during a backup operation to backup copies of source files in the file system to the backup image.

6. The article of manufacture of claim 1, wherein the applying of the policy to the backup files to determine the backup files in the backup image that satisfy the policy criteria comprises determining whether the backup files contain malicious code, wherein the deferred operation applied to the accessed source files in the file system comprises deleting the accessed source files.

7. The article of manufacture of claim 1, wherein the applying of the policy to the backup files to determine the backup files in the backup image that satisfy the policy criteria comprises:

scanning a content index associating content keywords with backup files to determine backup files having content terms indicated in the policy criteria; and copying the determined backup files from the backup image to an archival storage in response to determining from the content index backup files having the content terms in the policy criteria, wherein the deferred operation comprises deleting the accessed source files in the file system.

8. The article of manufacture of claim 1, wherein maintaining the backup image comprises maintaining a database having records providing information on backup files in a backup image on backup storage, and wherein applying the policy criteria to the backup files in the backup image comprises:

processing the records in the database to generate a virtual file system providing a representation of the backup files indicated in the database records in a hierarchical file system, wherein applying the policy criteria comprises:

issuing an access request to specified files represented in the virtual file system; accessing the database records for the specified files; and using the accessed database records to access the specified files in the backup image, wherein the policy criteria is applied to the specified files accessed from the backup image.

9. A system in communication with a file system, comprising:

a storage;

a computer readable storage media;

a backup program for maintaining a backup image of backup files comprising copies of source files in a file system, wherein real time file system operations are performed on the source files in the file system; and a policy tool for causing operations, the operations comprising:

applying a policy to the backup files in the backup image to determine backup files satisfying a policy criteria;

preparing a list indicating the determined backup files satisfying the policy criteria;

accessing the source files in the file system from which the determined backup files indicated in the list where copied;

determining whether the accessed source files have changed subsequent to a creation of the backup image;

applying the policy criteria to the accessed source files to determine accessed source files satisfying the policy criteria; wherein the policy is applied to the accessed source files that have changed subsequent to the creation of the backup image; and applying a deferred operation indicated in the applied policy to the determined accessed source files in the file system determined to satisfy the policy criteria, wherein the deferred operation is performed on the accessed source file in the file system in response to determining that the changed accessed source file satisfies the policy criteria and the deferred operation is not performed in response to determining that the changed accessed source file does not satisfy the policy criteria.

10. The system of claim 9, wherein the policy comprises an archive policy, and wherein the policy tool further causes copying the determined backup files from the backup image to an archival storage in response to determining that the accessed determined file policy indicates to archive the determined backup files, wherein the deferred operation comprises deleting the accessed source files in the file system.

11. The system of claim 9, wherein the policy tool further causes performing an operation indicated in the applied policy to the determined backup file in the backup image before accessing the source files in the file system from which the determined backup files indicated in the list were copied.

12. The system of claim 9, wherein the applying of the policy to the backup files to determine the backup files in the backup image that satisfy the policy criteria comprises determining whether the backup files contain malicious code, wherein the deferred operation applied to the accessed source files in the file system comprises deleting the accessed source files.

13. The system of claim 9, wherein the applying of the policy to the backup files to determine the backup files in the backup image that satisfy the policy criteria comprises:

scanning a content index associating content keywords with backup files to determine backup files having content terms indicated in the policy criteria; and copying the determined backup files from the backup image to an archival storage in response to determining from the content index backup files having the content terms in the policy criteria, wherein the deferred operation comprises deleting the accessed source files in the file system.

14. A computer implemented method, comprising:

maintaining a backup image of backup files comprising backup copies of source files in the file system, wherein real time file system operations are performed with respect to the source files in the file system;

applying a policy to the backup files in the backup image to determine backup files satisfying a policy criteria;

preparing a list indicating the determined backup files satisfying the policy criteria;

accessing the source files in the file system from which the determined backup files indicated in the list where copied;

determining whether the accessed source files have changed subsequent to a creation of the backup image;

applying the policy criteria to the accessed source files to determine accessed source files satisfying the policy criteria; wherein the policy is applied to the accessed source files that have changed subsequent to the creation of the backup image; and applying a deferred operation indicated in the applied policy to the determined accessed source files in the file system determined to satisfy the policy criteria, wherein the deferred operation is performed on the accessed source file in the file system in response to determining that the changed accessed source file satisfies the policy criteria and the deferred operation is not performed in response to determining that the changed accessed source file does not satisfy the policy criteria.

15. The method of claim 14, wherein the policy comprises an archive policy, further comprising:

copying the determined backup files from the backup image to an archival storage in response to determining that the accessed determined file policy indicates to archive the determined backup files, wherein the deferred operation comprises deleting the accessed source files in the file system.

16. The method of claim 14, further comprising:

performing an operation indicated in the applied policy to the determined backup file in the backup image before accessing the source files in the file system from which the determined backup files indicated in the list were copied.

17. The method of claim 14, wherein the applying of the policy to the backup files to determine the backup files in the backup image that satisfy the policy criteria comprises determining whether the backup files contain malicious code, wherein the deferred operation applied to the accessed source files in the file system comprises deleting the accessed source files.

18. The method of claim 14, wherein the applying of the policy to the backup files to determine the backup files in the backup image satisfy the policy criteria comprises:

scanning a content index associating content keywords with backup files to determine backup files having content terms indicated in the policy criteria; and copying the determined backup files from the backup image to an archival storage in response to determining from the content index backup files having the content terms in the policy criteria, wherein the deferred operation comprises deleting the accessed source files in the file system.

* * * * *